(12) United States Patent
Onuschak (10) Patent No.: US 10,821,912 B1
(45) Date of Patent: Nov. 3, 2020

(54) FOLDABLE TOOLBOX FOR A PICKUP TRUCK BED

(71) Applicant: Christopher Onuschak, Jacksonville Beach, FL (US)

(72) Inventor: Christopher Onuschak, Jacksonville Beach, FL (US)

(*) Notice: Subject to any disclaimer, the term of this patent is extended or adjusted under 35 U.S.C. 154(b) by 36 days.

(21) Appl. No.: 16/442,600

(22) Filed: Jun. 17, 2019

(51) Int. Cl.
*B60R 11/06* (2006.01)
*B60R 5/04* (2006.01)
*B25H 5/00* (2006.01)

(52) U.S. Cl.
CPC ............... *B60R 11/06* (2013.01); *B25H 5/00* (2013.01); *B60R 5/04* (2013.01)

(58) Field of Classification Search
CPC .. B60R 11/06; B60R 5/00; B60R 5/04; B25H 5/00
USPC .......................................... 296/37.6; 224/404
See application file for complete search history.

(56) References Cited

U.S. PATENT DOCUMENTS

| 1,179,445 | A | * | 4/1916 | Manning | B60R 7/043 296/37.5 |
| 3,640,565 | A | * | 2/1972 | Anderson | B60J 7/041 296/100.04 |
| 3,841,237 | A | * | 10/1974 | Plymate | A47B 43/00 108/6 |
| 5,709,329 | A | * | 1/1998 | Johnson | B60R 7/04 108/137 |
| 2006/0266778 | A1 | * | 11/2006 | Allotey | B60R 9/00 224/403 |
| 2010/0264180 | A1 | * | 10/2010 | Allotey | B60R 11/06 224/404 |

* cited by examiner

*Primary Examiner* — Dennis H Pedder
(74) *Attorney, Agent, or Firm* — Lawrence J. Gibney, Jr (57) ABSTRACT

This toolbox will be mounted in a pickup truck bed and will expand to create space for a toolbox if needed and will also collapse when a toolbox is not needed. It is secured to the front wall of the pickup truck bed and will take up a minimum amount of space when it is not being used as a toolbox. A lock to secure the contents of the toolbox is also provided when the toolbox is in use. The top surface of the toolbox will remain flush with the pickup truck bed to avoid obscuring the view of the driver.

3 Claims, 9 Drawing Sheets

FOLDABLE TOOLBOX FOR A PICKUP TRUCK BED

FIELD OF THE INVENTION

This relates to a collapsible toolbox in a pickup bed truck. A toolbox is a common item in a pickup truck bed but the ordinary toolbox is bulky and deprives the truck owner from using much of the space in the pickup truck bed. A pickup truck toolbox may also obscure the view of the driver depending on the height of the toolbox. This device is no higher than the level of the truck bed so the vision of the driver is not obscured. It will also collapse and rest against the front wall of the pickup truck bed when it is in the collapsed state in order to allow the truck owner to use as much space as possible of the pickup truck bed.

PRIOR ART

There are other prior art references to foldable toolboxes. A representative of this can be found in Maimin U.S. Pat. No. 854,708. This references a folding pickup truck toolbox which fits on the back of a pickup truck. A pair of grooves are placed on the side to encompass the space of the toolbox. The toolbox is finally unfolded and occupies the space. In the current application there is no track system in which to expand the toolbox but this toolbox will fold down to a relatively small area.

Another reference can be found at Groth, U.S. Pat. No. 4,350,257, which is a kit for assembling a toolbox which is specifically adapted for insulation in the back of a pickup truck.

Another reference is Stapp, U.S. Pat. No. 5,186,510, which is a foldable pickup truck toolbox. There will be sections that will fold onto each other to save space. In this particular application, the toolbox is bolted to the bed of the pickup truck.

Another reference can be found at Ymini, U.S. Pat. No. 5,762,411. The Ymini device is a reference to discuss strategic toolboxes and folding bins or compartments and is simply a reference that discusses the way toolboxes can be folded onto one another and discusses, or teaches, the idea of a folding toolbox.

BRIEF SUMMARY OF THE INVENTION

This toolbox is placed in the back of a pickup truck against the back or front wall of the pickup truck closest to the driver and is bolted into the pickup truck bed with anchoring bolts at the bottom and securing hooks at the top. The device is intended to be secured to the back of the pickup truck bed.

When the toolbox is to be used, the user can expand the toolbox to a certain length and tools or other common items can be placed place in the toolbox. A lock is provided so that the owner's tools can remain secure.

When the tools are no longer needed the toolbox can be collapsed and folded to rest against the front wall of the pickup truck bed.

It is anticipated that hinges will be used that will allow the device to expand and collapse and the lid, which is on the top of the toolbox, will be as long as the front panel is high so that it will be able to be folded into a relatively small area.

Additionally, a shelf may be placed in the interior of the toolbox to provide a workspace for the user. The shelf will also rotate to lie flat against a panel when the tool box is collapsed and not being used.

Because this toolbox will be exposed to a variety of environmental conditions, it should be constructed from durable material. No particular type of material is being claimed in this application.

NUMBERING REFERENCES

1—pickup truck
5—collapsible toolbox
10—top panel
15—back panel
20—front handle
25—bottom panel
30—front panel
35—anchoring bolts
40—securing hook
45—lid hinge
50—locking hinge
55—bottom hinge
60—arms
65—top hinge
70—locking hole
75—shelf
80—shelf arm
85—shelf hinge
90—telescoping arm
95—grommets with openings

DETAILED DESCRIPTION OF THE EMBODIMENTS

This device is a collapsible toolbox 5 will be placed in the back of a pickup truck 1; the pickup truck is not being claimed but the device will be secured in the bed of a pickup truck bed through anchoring bolts 35 for that purpose. the device will be placed flush against the wall that is closest to the driver. In an attempt to prevent theft of the toolbox a pair of securing hooks 40 will be placed on the pickup bed truck and will secure th folded toolbox once it is in a collapsed form. The securing hooks 40 will also eliminate any movement of the collapsed toolbox as the pickup truck is moving.

Figure 1:
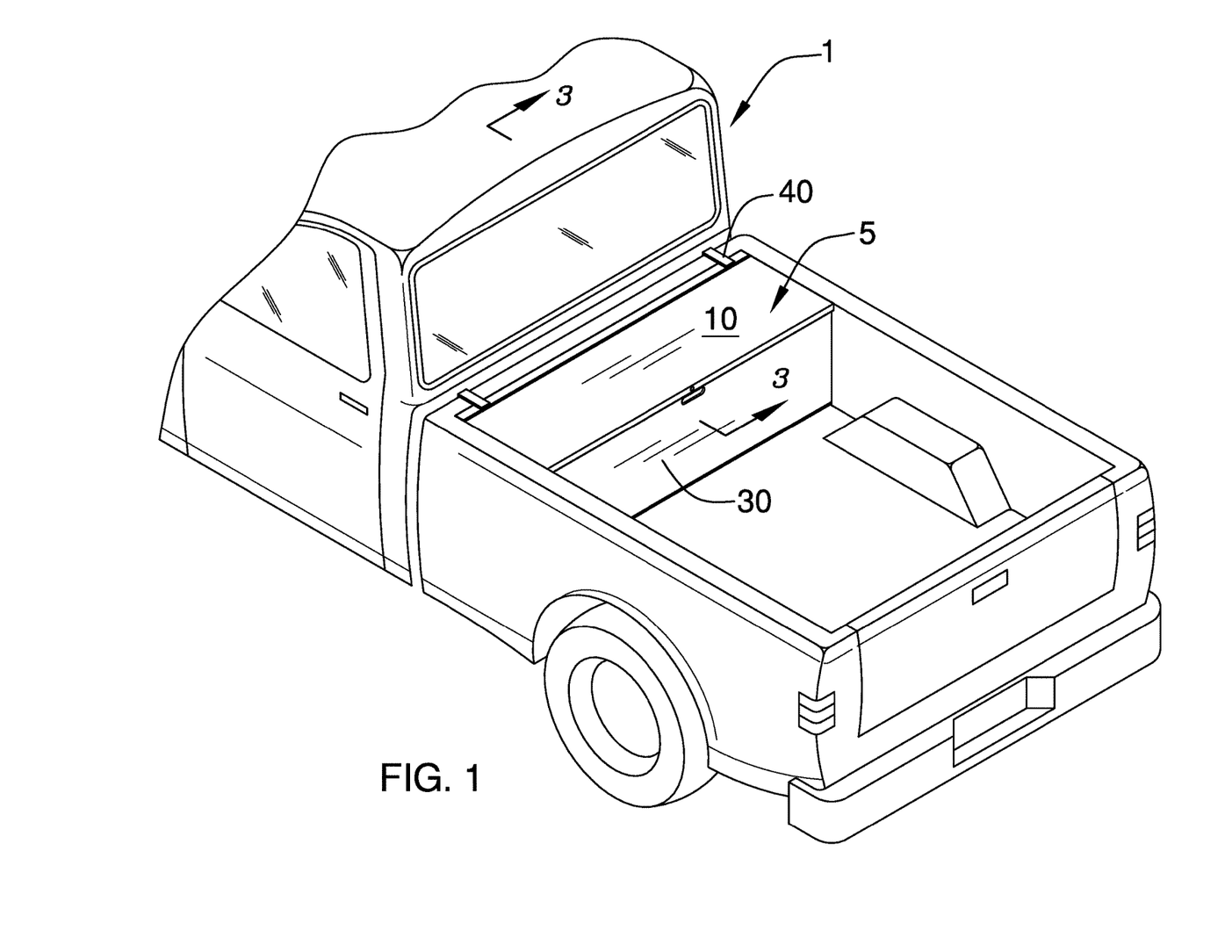
FIG. 1 is an isometric view of the device is expanded and depicts the device positioned in the bed of a pickup truck.
Figure 2:
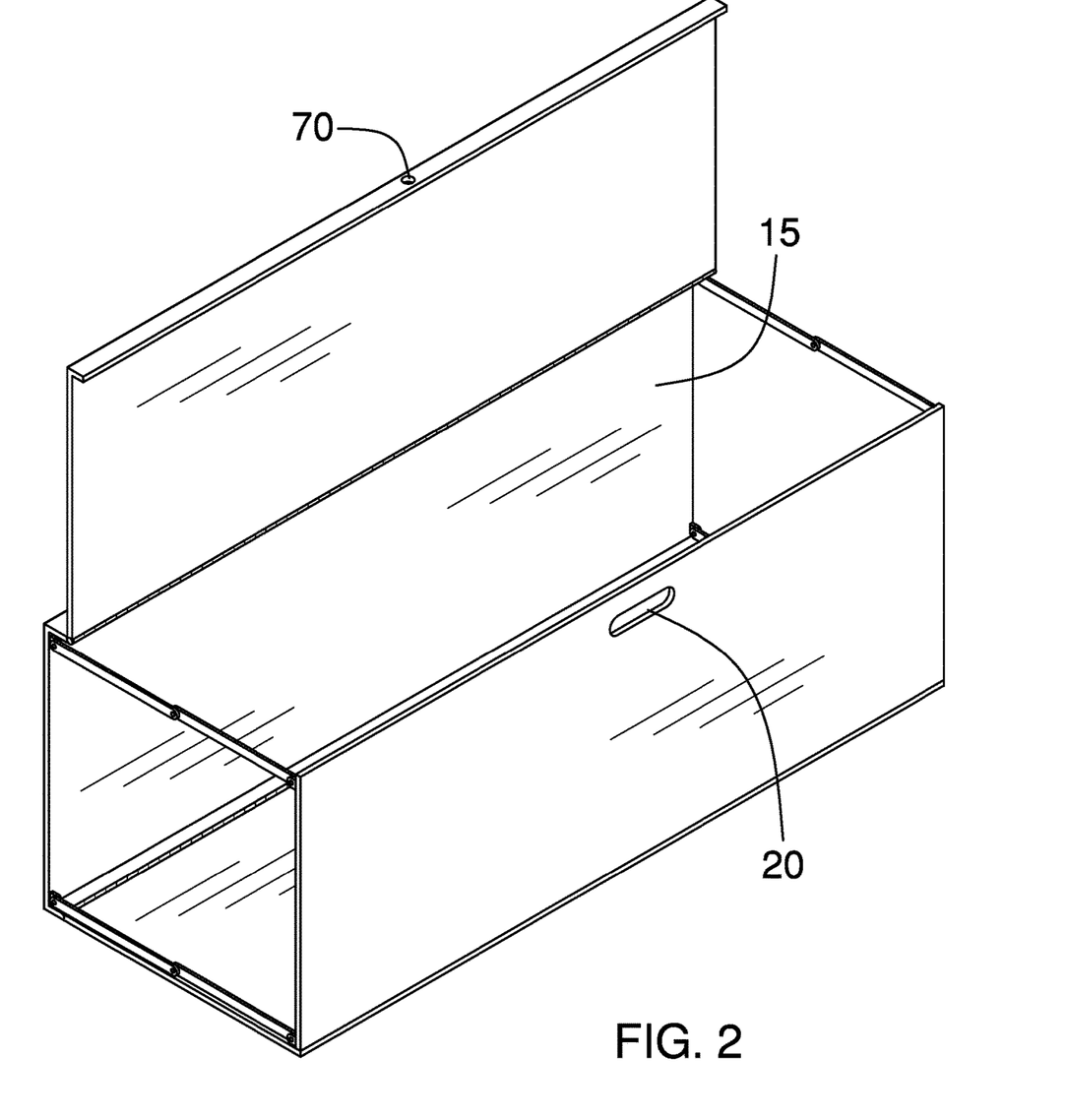
FIG. 2 is an isometric view of the expanded device not installed in the back of a pickup truck bed.

In the expanded version as it is shown in FIG. 1, the device will be a completely operational toolbox. The toolbox will have four panels: a top panel, 10, a back panel, 15; a front panel, 25, side panels and a bottom panel, 30. These panels will in turn define the shape of the toolbox which is hollow when fully expanded Additionally, a handle will be placed on the front so the user can easily expand or collapse the toolbox.

Figure 4:
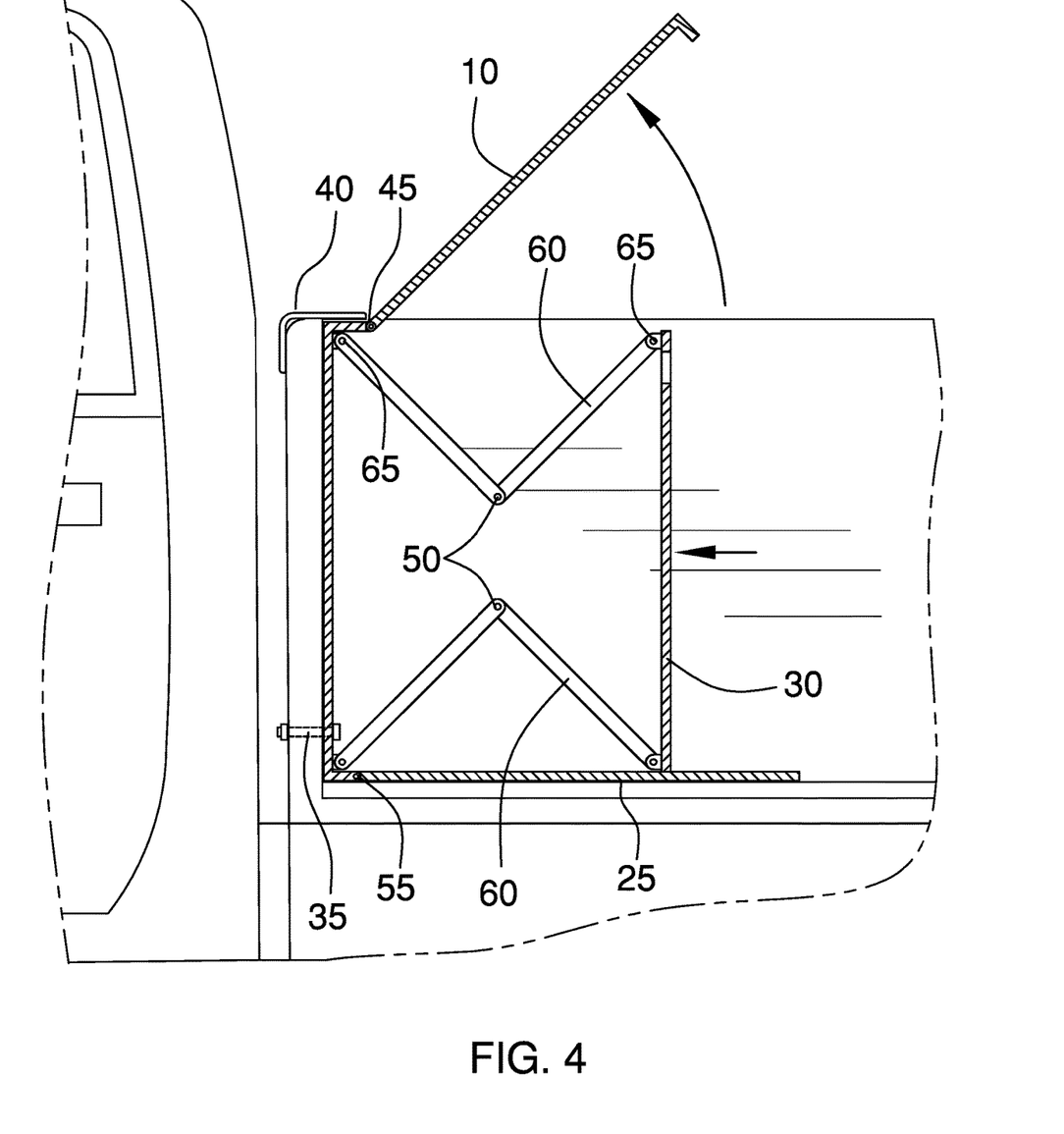
FIG. 4 is a depiction illustrating how the toolbox can be collapsed.

In order to be able to collapse the toolbox a pair of arms, 60, will be placed in the interior of the toolbox and will extend from the front to the back of the toolbox. In the center of these arms will be locking hinges, 15, which will bend and rotate when it is collapsed, such as depicted in FIG. 4. The locking hinges will maintain the shape of the toolbox and provide needed rigidity for the toolbox.

Figure 5:
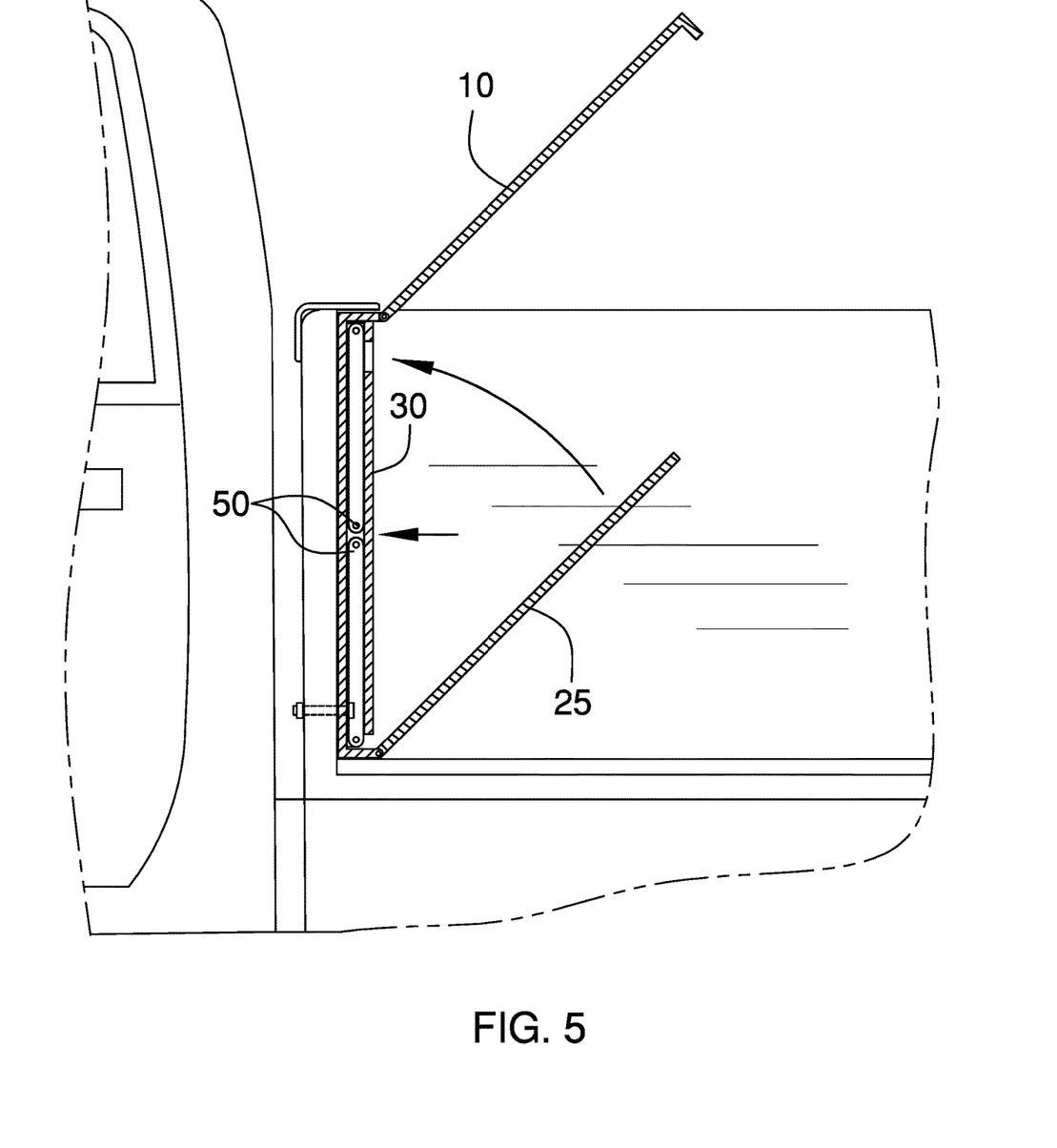
FIG. 5 is a depiction of the device being folded.
Figure 6:
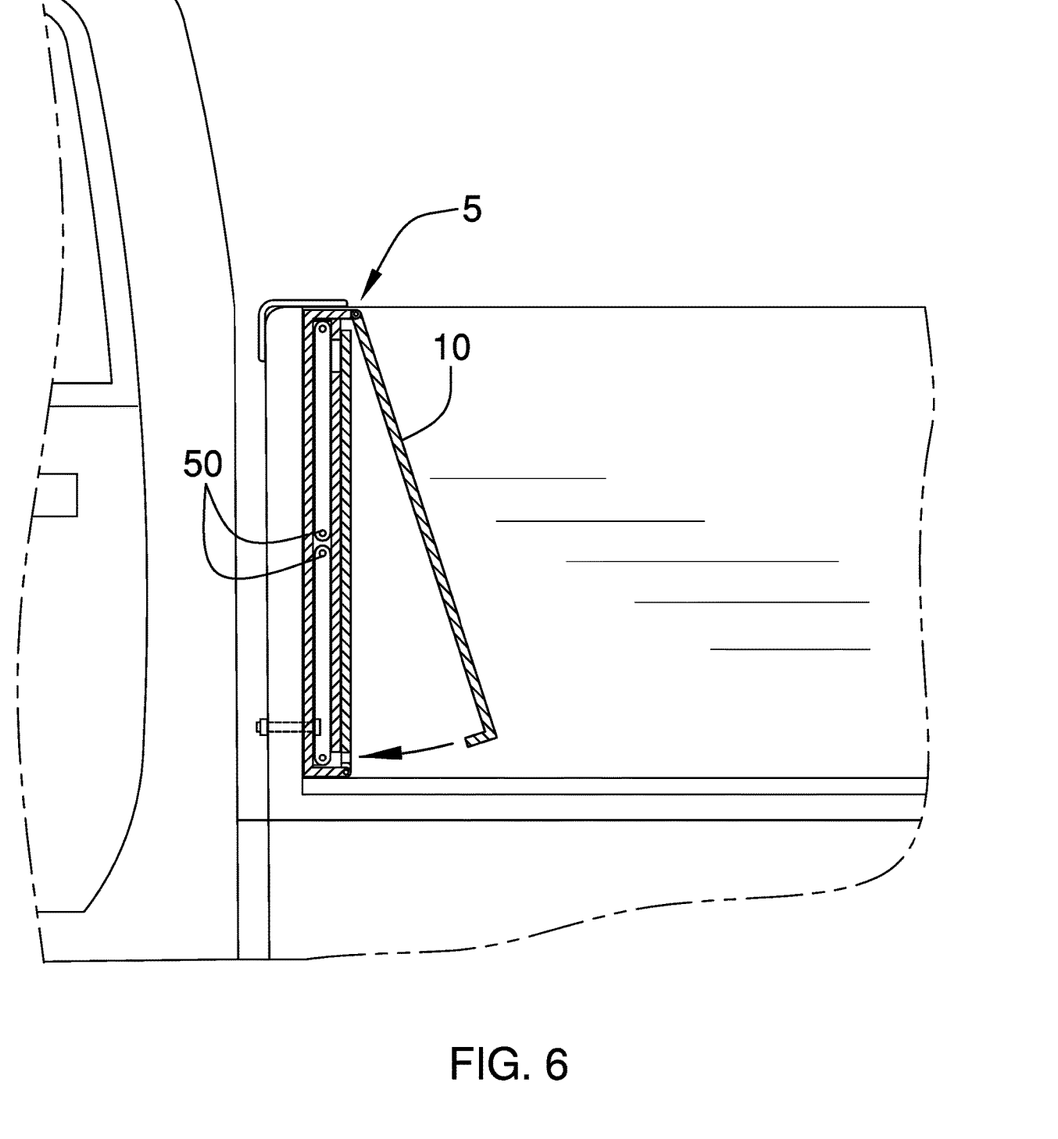
FIG. 6 is a depiction of the device when the toolbox is completely folded and not in use.

After the device is being folded, such as depicted in FIGS. 5 and 6, it will reduce the amount of space that the toolbox will occupy in the pickup truck bed.

In order to make sure that the toolbox will remain secure, anchoring bolts 35 are used to mount it to the front wall of the pickup truck bed. On the top surface of the toolbox will be securing hooks, 40, which will ensure that the device remains stationary in the pickup truck bed while at the same make it more difficult to steal.

A shelf 75 will also be incorporated into the toolbox to allow the worker to a platform for use during operation. The shelf 75 is hinged with an arm 80 that will maintain the position of the shelf in the toolbox while the shelf is in use.

Figure 3:
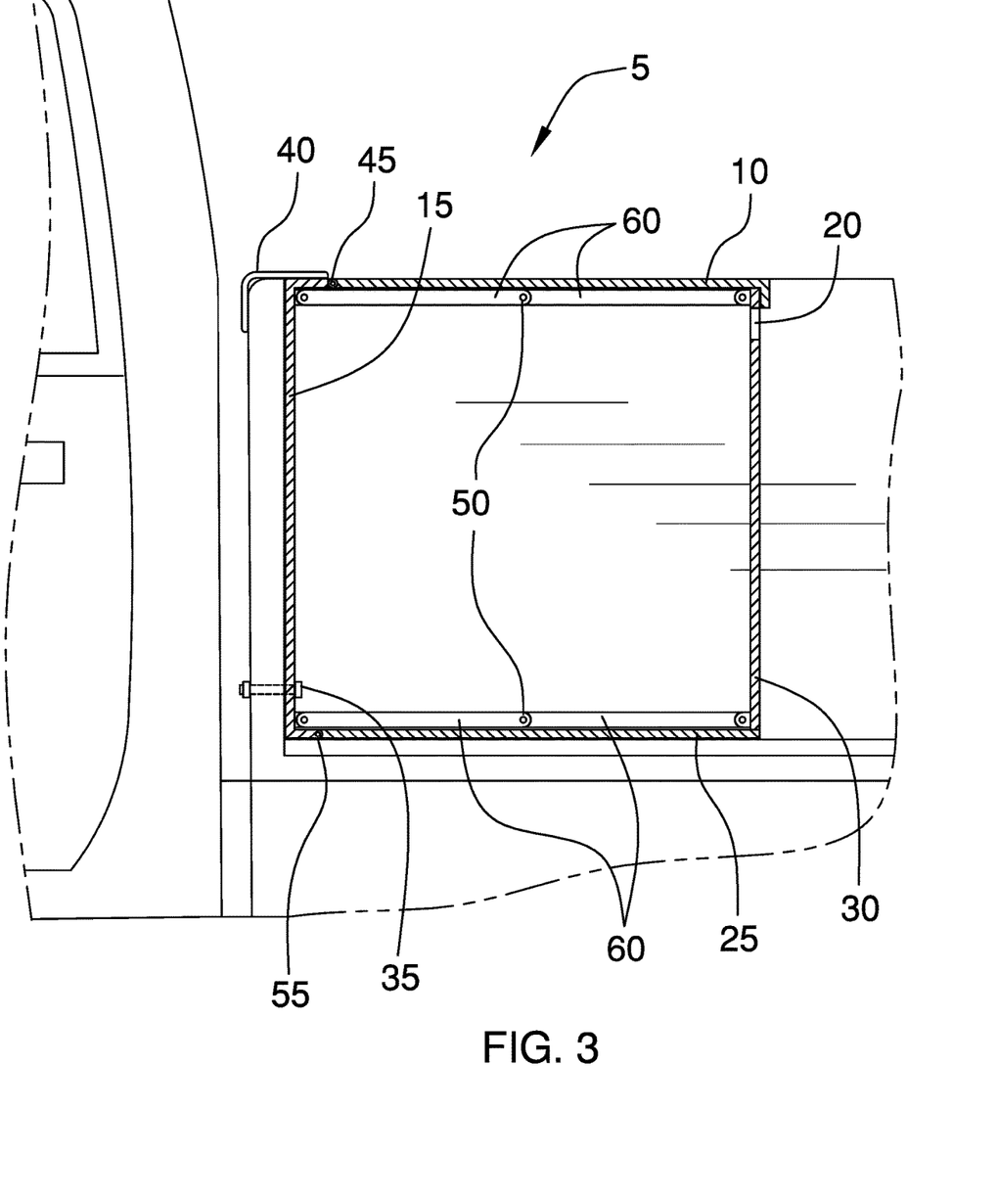
FIG. 3 is a side view of the pickup truck folding toolbox installed in the back of a pickup truck.

In the first embodiment the bottom panel 25 as shown in FIGS. 3 and 4 is hinged at the junction of the bottom plate and the back panel 15. In order to allow a person to pull open the toolbox the bottom panel may be hinged in the middle of the panel (not depicted) so that the section of the bottom panel between the hinges will fold naturally on top of each other. With a hinged section in the middle of the bottom panel 25 it will shorten the time to open the toolbox but still allow the toolbox to be opened or collapsed as originally contemplated.

Because the toolbox will be exposed to a variety of environments, it will be important that the device is constructed from material that is weather resistant.

In addition, the device will be able to be locked so that the contents in the toolbox cannot be pilfered when the device is not in use.

Alternative Embodiment

Figure 7:
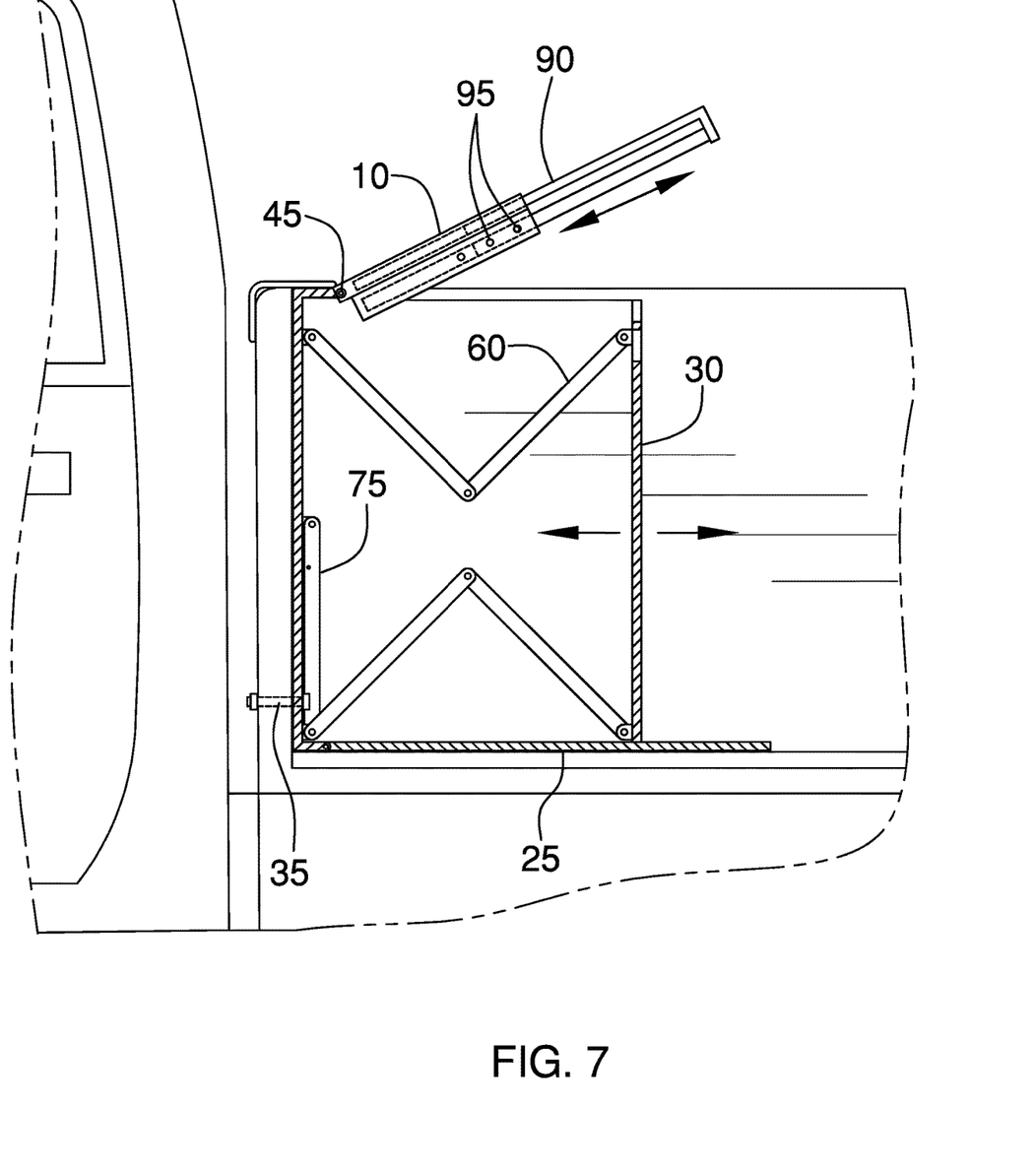
FIG. 7 is a depiction of the alternative embodiment depicting the telescoping lid.

In the second embodiment the top lid 10 can be expanded in length through an encapsulated telescoping arm that is placed with the hollow portion of the lid 10. A plurality of openings into which grommets will be placed can lock the telescoping arm into the respective opening to alter the length of the top lid 10. Although not specifically depicted the bottom panel may also telescope to the same length of the top panel to ensure that the toolbox (as expanded) can be constructed.

Figure 8:
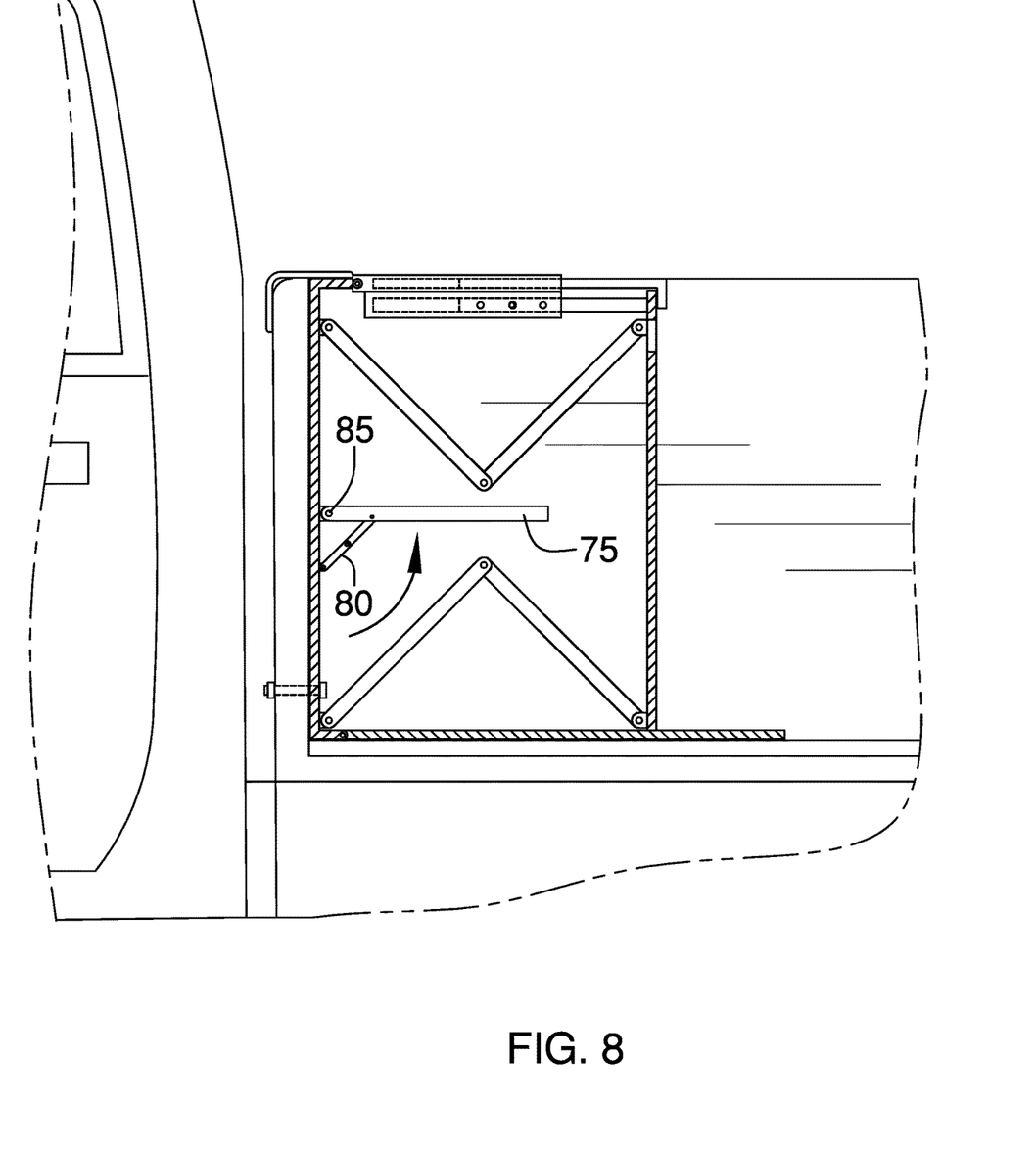
FIG. 8 is a depiction the alternative embodiment showing a partially open toolbox.
Figure 9:
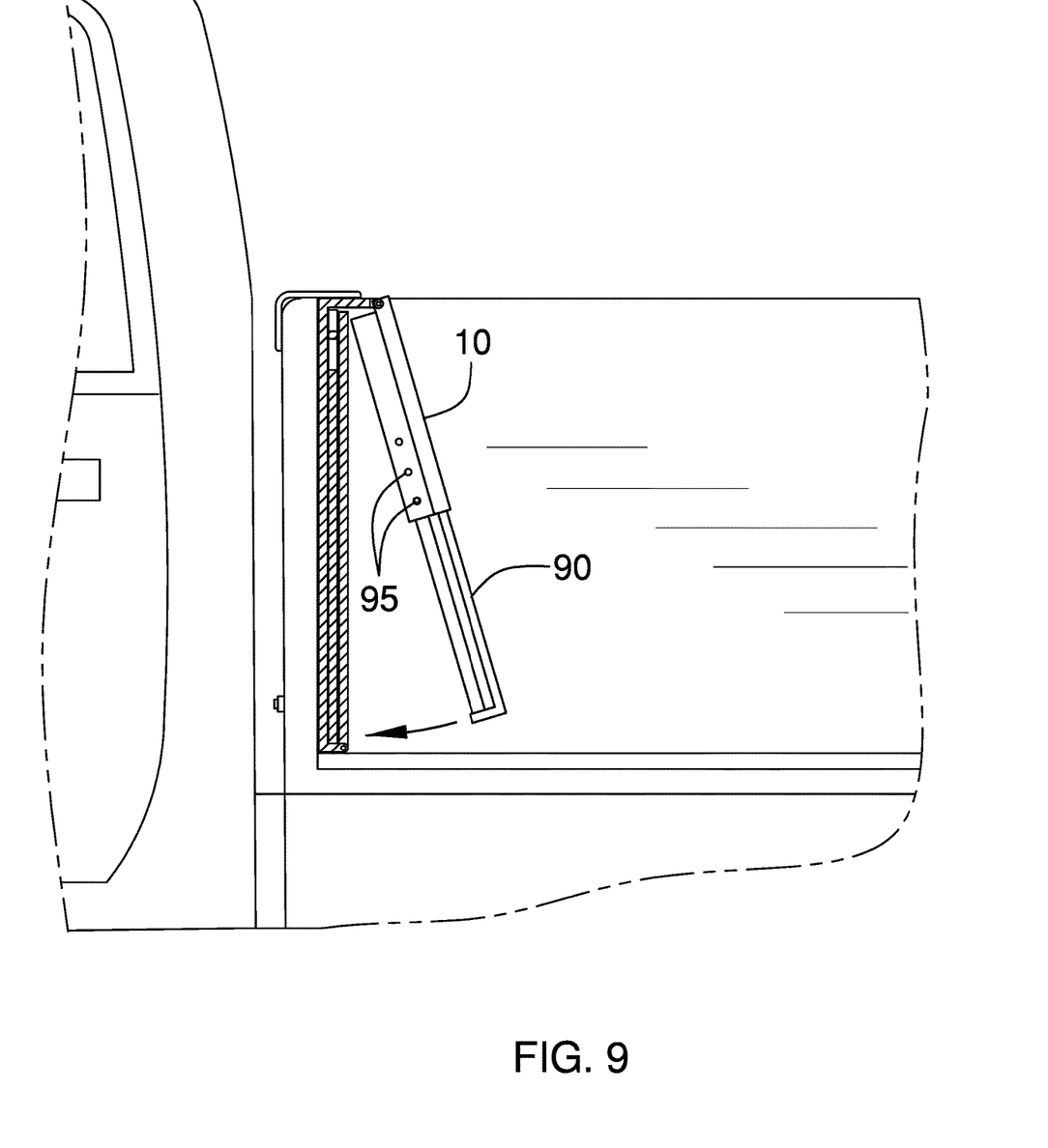
FIG. 9 is a depiction of the alternative embodiment as it is folded.

This alternative embodiment allows additional storage for items that are placed in the toolbox while at the same time permitting the expandable toolbox to operate like a toolbox. When the toolbox is to be folded back into the original position the shelf (if in use) will be folded against the side of the back panel and the telescoping portion will be adjusted to the correct length to accommodate the length of the back panel so that the toolbox can be folded once again and locked in place.

The inventor claims:

1. A foldable toolbox in the back of a pickup truck bed which is comprised of:
a toolbox of predetermined shape;
wherein the toolbox has a front panel;
wherein the toolbox has a bottom panel;
wherein the toolbox has a back panel;
wherein the bottom panel is hinged to the back panel;
wherein the toolbox has a top panel hinged to the back panel;
wherein the toolbox is collapsible;
wherein a plurality of arms is provided;
said arms allow the toolbox to expand;
wherein a front handle is provided;
a shelf;
wherein the shelf is secured to the back panel;
said shelf is rotatable;
wherein the shelf collapses against the back panel;
anchoring bolts;
wherein a plurality of anchoring bolts are provided;
said plurality of anchoring bolts secure the toolbox.

2. A foldable toolbox in the back of a pickup truck bed which is comprised of:
a toolbox of predetermined shape;
wherein the toolbox has a front panel;
wherein the toolbox has a bottom panel;
wherein the toolbox has a back panel;
wherein the bottom panel is hinged in the middle of the bottom panel;
wherein the toolbox has a top panel hinged to the back panel;
wherein the toolbox is collapsible;
wherein a plurality of arms is provided;
said arms allow the toolbox to expand;
wherein a front handle is provided;
a shelf;
wherein the shelf is secured to the back panel;
said shelf is rotatable;
wherein the shelf collapses against the back panel;
anchoring bolts;
wherein a plurality of anchoring bolts are provided;
said plurality of anchoring bolts secure the toolbox.

3. A foldable toolbox in the back of a pickup truck bed which is comprised of:
a toolbox of predetermined shape;
wherein the toolbox has a front panel;
wherein the toolbox has a bottom panel;
wherein the toolbox has a back panel;
wherein the bottom panel is hinged to the back panel;
wherein the toolbox has a top panel hinged to the back panel;
a telescoping member;
wherein the telescoping member is inserted into a cavity of the top panel;
said telescoping member permits the length of the top lid to be adjusted;
wherein the toolbox is collapsible;
wherein a plurality of arms are provided;
said arms allow the toolbox to expand;
wherein a front handle is provided;
a shelf;
wherein the shelf is rotatable;
wherein the shelf collapses
anchoring bolts;
wherein a plurality of anchoring bolts are provided;
said plurality of anchoring bolts secure the toolbox.

* * * * *